United States Patent
Sims

[11] Patent Number: 6,086,768
[45] Date of Patent: Jul. 11, 2000

[54] METHOD FOR DEMULSIFICATION OF EMULSIONS CONTAINING DENSE GAS AND LIQUID AND A SURFACTANT

[75] Inventor: Marc Sims, Berkeley, Calif.

[73] Assignee: Porocrit L.L.C., Berkeley, Calif.

[21] Appl. No.: 09/149,255

[22] Filed: Sep. 8, 1998

[51] Int. Cl.[7] .......................... B01D 17/04; B01D 53/22
[52] U.S. Cl. .................. 210/634; 210/640; 210/708; 95/46; 95/51
[58] Field of Search .................. 210/634, 640, 210/708, 321.74, 321.78, 321.8; 95/45, 46, 50, 51; 96/4, 6, 7, 8, 10

[56] References Cited

U.S. PATENT DOCUMENTS 5,490,884  2/1996  Robinson et al. .................. 95/45

FOREIGN PATENT DOCUMENTS

WO 97/18234  5/1997  WIPO .
WO97/18234  5/1997  WIPO .

OTHER PUBLICATIONS

Tirmizi et al, Demulsification of Water/Oil/Solid Emulsions . . . , AIChE Journal 42(5) (1996).
D.A. Newman et al, Phase Behavior of Fluoroether . . . , Journal of Supercritical Fluids 6, p205–210 (1993).
K.P. Johnson et al, Water–in–Carbon Microemulsions . . . , Science 271, 626 (1996).
K. Jackson et al, Microemulsions in Supercritical Hydro . . . , Langmuir I 2(22) 5289–5295 (1996).
E. W. Kaier et al, Physical Chemistry, 96, 458 (1991).
D. G. Peck et al, Physical Chemistry, 95, 9549 (1991).
D.J. McFann et al, Phase Behavior of AOT . . . , Physical Chemistry 65 p4889 (1991).
Roubi, Colorful inorganic chemistry . . . , C&EN Aug. 11, 1997 p40.
K. Johnston, Supercritical $CO_2$ Extracts Biomolecules, Inside R&D vol. 25 No. 7, Feb. 14, 1996.
Author unknown, "Liquid Assets", Food Processing Oct. 1996, p77.

Primary Examiner—David A. Simmons
Assistant Examiner—Frank M. Lawrence
Attorney, Agent, or Firm—Harris Zimmerman

[57] ABSTRACT

Emulsions containing dense gas, liquid and a surfactant which may have been used for extraction of a solute from a substance or for other purposes are demulsified by passage through a membrane contactor. An emulsion flow path in the contactor is separated from a dense gas and surfactant flow path by membrane having pores which enable passage of the dense gas and surfactant constituents of the emulsion through the membrane while inhibiting passage of the liquid and any solute which may be therein. The membrane may be a plurality of hollow fibers. A portion of the recovered dense gas may be vaporized, temperature adjusted and be repressurized and be redirected into the dense gas and surfactant flow path to increase processing rate. Recovered dense gas and surfactant may be returned to the emulsion source for reuse therein.

16 Claims, 4 Drawing Sheets

METHOD FOR DEMULSIFICATION OF EMULSIONS CONTAINING DENSE GAS AND LIQUID AND A SURFACTANT

TECHNICAL FIELD

This invention relates to chemical processes which make use of an emulsion containing dense gas, a liquid and a surfactant which emulsion may be used as a solvent or for other purposes. More particularly, the invention relates to a method and apparatus for demulsifying the emulsion to enable reuse of constituents and/or to facilitate extraction of solutes or for other purposes.

BACKGROUND OF THE INVENTION

Emulsions comprised of a dense gas, a liquid polar solvent and a surfactant have been recognized to be highly useful processing fluids for a variety of purposes such as, for example, use as a solvent for extracting soluble substances from fluids. The solute which is extracted may typically be a flavor, fragrance, pharmaceutical, chelated metal or non-volatile hydrophilic substances such as proteins.

Using a dense gas/liquid/surfactant emulsion as a processing fluid, such as a solvent for example, has a number of advantages. One is that it is easier to obtain solvent free products because of the high vapor pressure of a dense gas. The dense gas is easily vaporized without requiring a great deal of heating. The resulting moderate processing temperature preserves the integrity of heal sensitive products. Energy is also conserved.

A dense gas, for example $CO_2$ at a density greater than about 0.3 g/cc, has additional advantages. Carbon dioxide is non-toxic, non-inflammable, inert to most materials and is inexpensive. Dense gases have low viscosities which lead to high diffusion and mass transfer rates.

A disadvantage of dense gases as solvents is that their dissolving power is generally lower than that of conventional liquids. For example, dense $CO_2$ dissolves primarily low-polarity materials, but not high-polarity materials such as proteins, carbohydrates and ionic compounds. However, these high-polarity compounds dissolve in a polar solvent such as water.

An emulsion of a liquid polar solvent, such as water, in a dense gas, such as compressed $CO_2$, provides a processing fluid with some of the properties of both fluids. For example, the dispersed micelles of water provide dissolving power for proteins, while the dense $CO_2$ provides favorable bulk properties such as low viscosity.

Dense gas/liquid emulsions eventually separate back into layers of the two phases. However, the emulsions become stable dispersions for practical purposes when an appropriate surfactant is added to the mixture.

The dense gas/liquid emulsions become more useful as processing fluids when they can be demulsified to enable recovery of the surfactant and dense gas. A product, such as a protein dissolved in liquid water, can then be recovered without being contaminated with the surfactant. The dense gas and expensive surfactant can then be recycled to make the process economically feasible. Prior methods and apparatus for accomplishing demulsification of dense gas/liquid/surfactant emulsions are not ideally suited for this purpose.

For example, International Patent Application No. PCT/US96/18168, published May 22, 1997 (International Publication No. WO 97/1823) describes an extraction process using dense $CO_2$/water/surfactant as the processing fluid. The carbon dioxide and surfactant are to be recycled. The described method for recovering the $CO_2$ includes complete vaporization of the $CO_2$ by decompression to its gaseous state. This leaves a residue of liquid water mixed with surfactant. The surfactant is recovered from the residue by decanting or other physical means known to the art. Some lost surfactant remains in the product after decanting. Recycling requires a makeup step to compensate for the lost surfactant. The decompression and subsequent recompression of the $CO_2$ for recycling also complicates the process and increases costs.

The present invention is directed to overcoming one or more of the problems discussed above.

SUMMARY OF THE INVENTION

In one aspect the invention provides a method of demulsifying an emulsion which includes dense gas, a liquid which is immiscible with the dense gas and a dense gas soluble surfactant which has a stabilizing effect on the emulsion. Steps in the method include directing the emulsion into an emulsion flow path within a membrane contactor wherein the emulsion flow path is separated from a dense gas flow path by a porous membrane having pores which enable passage of dense gas and surfactant into the dense gas flow path and which inhibit passage of the liquid into the dense gas flow path. Further steps include withdrawing substantially surfactant free liquid from the emulsion flow path and withdrawing dense gas and surfactant from the dense gas flow path.

In another aspect the invention provides apparatus for demulsifying an emulsion which contains a dense gas, a liquid which is immiscible with the dense gas and a dense gas soluble surfactant which acts to stabilize the emulsion. Components of the apparatus include a membrane contactor having an emulsion flow path separated from a dense gas flow path by a porous membrane. Pores in the membrane enable passage of dense gas and surfactant from the emulsion flow path into the dense gas flow path while inhibiting passage of the liquid therebetween. An emulsion source is communicated with the emulsion flow path at a first location therein. A liquid outflow conduit communicates with the emulsion flow path at a second location therein and a dense gas and surfactant outflow conduit communicates with the dense gas flow path.

The invention separates a flow of dense gas/liquid/surfactant emulsion into a flow of liquid that is substantially free of surfactant and a flow of recovered dense gas and surfactant. The dense gas and surfactant may be recycled without undergoing further processing such as decompression, recompression and remixing. This results in substantial cost savings and reduces equipment costs and complexity. The need for an additional product purification step may be eliminated in instances where the emulsion contains a solute that is to be recovered from the liquid as a product of the process.

The invention, together with further aspects and advantages thereof, may be further understood by reference to the following description of the preferred embodiments and by reference to the accompanying drawings.

DETAILED DESCRIPTION OF THE PREFERRED EMBODIMENTS

Figure 1:
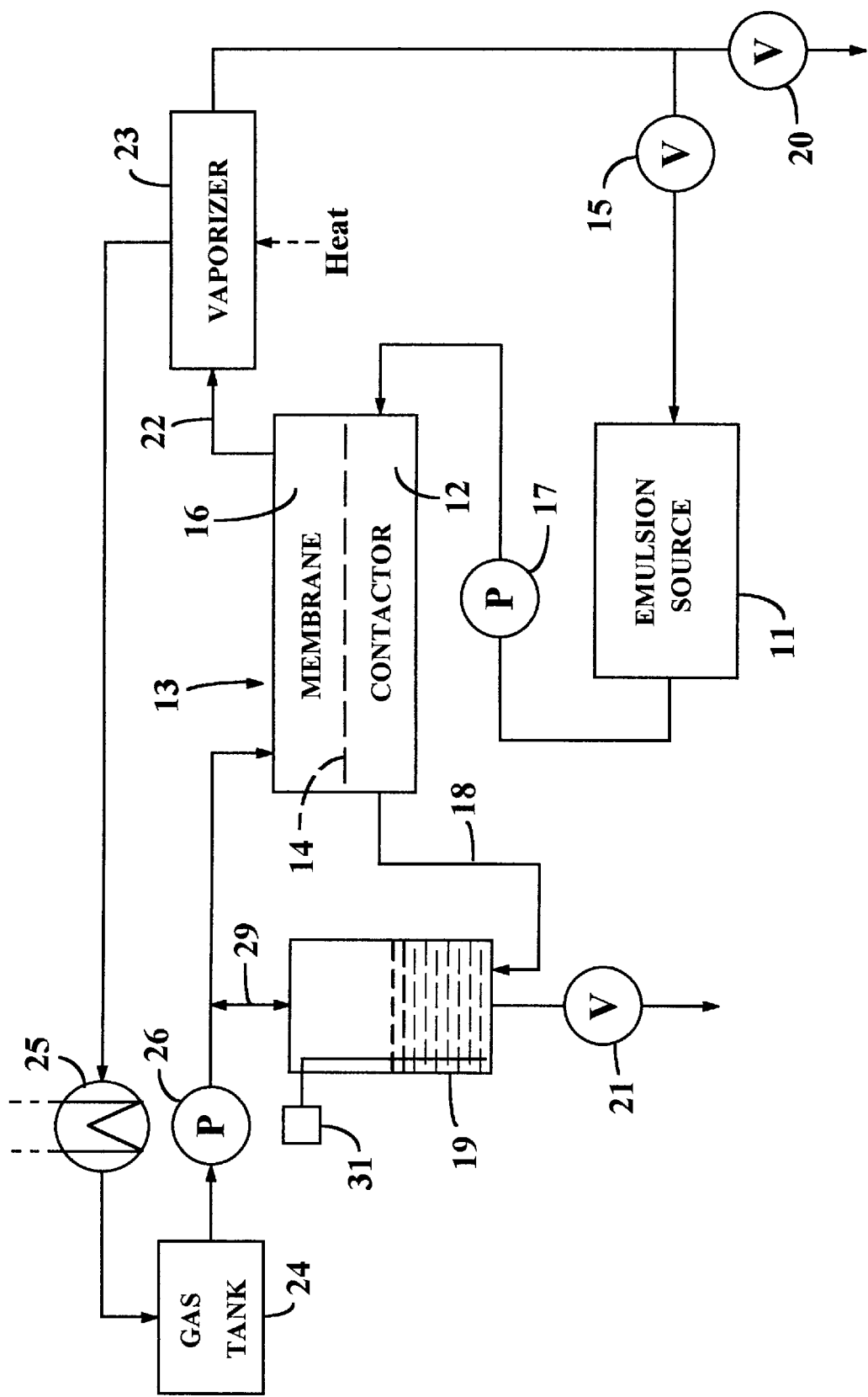
FIG. 1 is a schematic diagram depicting apparatus which may be used in the practice of the invention.

Referring initially to FIG. 1 of the drawings, basic steps in the practice of the method of demulsifying a dense gas/liquid/surfactant emulsion include directing a flow of the emulsion from an emulsion source 11 into a first region 12 of a membrane contactor 13. Porous membrane 14 within the membrane contactor 13 separates the first region 12 from a second region 16 within the membrane contactor. A preferred detailed construction for the membrane contactor 13, using a plurality of hollow fiber membranes, will be hereinafter described. The porous membrane 14, which will also be further described, has properties which enable passage of the dense gas and surfactant constituents of the emulsion from first region 12 into the second region 16 while inhibiting passage of the liquid constituent between the two regions.

Further steps include withdrawing liquid from the first region 12 that is substantially free of surfactant and recovering the dense gas and surfactant by withdrawing the mixture of these constituents from the second region 16.

The emulsion source 11 may be apparatus of any of the known kinds which use emulsified dense gas and liquid and surfactant as a processing fluid. In most apparatus of this kind the emulsion functions as a solvent which extracts a desired product from a substance that contains other constituents in addition to the desired product. When the emulsion source 11 is of this type, the product passes through the first region 12 of membrane contactor 13 as a solute in the liquid component of the emulsion. The solute product may be extracted from the liquid which is withdrawn from the first region 12 by any of the processes known to the art.

The pressurized dense gas and surfactant which is withdrawn from the second region 16 of membrane contactor 13 may be recycled by being returned to the emulsion source 11 in order to continue the solute extraction process. Alternately, relatively costly surfactant may be recovered by vaporizing the dense gas.

Faster removal of surfactant from the second region 16 of membrane contactor 13 may be effected by directing additional dense gas into the second region. This additional dense gas may be obtained from the dense gas and surfactant flow that is withdrawn from the membrane contactor 13 in a manner which will hereinafter be further described.

Pressures within the first and second regions 12 and 16 of membrane contactor 13 are equalized at the time that the demulsification process is initiated and are maintained at nearly the same pressure as processing proceeds. Preferably the pressure in the first region 12 is maintained slightly higher than the pressure in the second region 16 with the pressure differential being less than a breakthrough pressure at which passage of sizable amount of liquid through the membrane 14 will be observed. The breakthrough pressure is dependent on the particular dense gas and liquid and surfactant which are present and on structural and chemical characteristics of the membrane 14 and can easily be determined in any specific system by detecting the presence of liquid in the second region 16 during a gradual raising of the pressure differential. Passage of a small amount of liquid through the membrane 14 may occur in instances where the liquid is slightly soluble in the dense gas. Water, for example, is slightly soluble in dense $CO_2$.

The dense gas is a fluid which is a gas at normal atmospheric pressure, but under elevated pressure is a fluid with a density of about 0.3 g/cc or greater. The dense gas may be selected from a number of different gases with carbon dioxide being preferred as it is non-toxic, non-inflammable, inert to most materials and inexpensive. Examples of other dense gases which may be used include methane, ethane, propane, butane, isobutane, ethene, propene, tetrafluoromethane, chlorodifluoromethane, dinitrogen monoxide, sulphur hexafluoride, ammonia, methyl chloride and hydrofluorocarbons. The hydrofluorocarbons include partially fluorinated methanes, ethanes and propanes, such as fluromethane, trifluoromethane, tetrafluoroethane (known commonly as HFC-135a), 1, 1, 1, 2, 3, 3, 3-heptafluoropropane (known commonly as P227), HFC-143a and HFC-125 and mixtures thereof.

The liquid constituent of the emulsion is a fluid which is essentially immiscible with the dense gas. If the emulsion is used as a solvent to extract a desired product from a substance, the liquid is also one which is capable of dissolving the desired product. The liquid may be selected from a number of different liquids, with water being the preferred liquid in instances where it meets the foregoing criteria. Propylene glycol and glycerol are examples of other liquids which may be the liquid constituent of the emulsion.

An appropriate surfactant constituent for the emulsion is determined by the particular dense gas and particular liquid which are used as it functions to bind to each in a manner which stabilizes the emulsion. Suitable surfactants for specific emulsions are known to the art. For example, useful surfactants for dense $CO_2$/water emulsions are described by K. P. Johnson et al, *Science* 271, 626 (1996) and by D. A. Newman et al, *The Journal of Super-critical Fluids*, 6, 205 (1993). Useful surfactants for dense alkane gas/water emulsions are described by E. W. Kaier et al, *Physical Chemistry*, 96, 458 (1991) and D. G. Peck et al, *ibid*, p9549 and D. J. McFann et al, *ibid*, p 4889. Surfactants for dense hydrochlorofluoro carbons/water emulsions are described by K. Jackson et al, *Langmuir I*, 2(22), p5289–5295 (1996).

Membrane 14 may be formed of any of a number of different materials examples of which include polypropylene, polyethylene, polytetrafluoroethylene, polyvinylidene difluoride, nylon, polysulfonate, polycarbonate, polyester, cellulose acetate, cellulose nitrate, cellulose and acrylic. The thickness of the membrane 14 is preferably within the range from about 0.005 mm to about 3 mm and more preferably is within the range from about 0.2 mm to about 0.6 mm which latter range provides the best balance of membrane strength and integrity combined with optimum flow characteristics. The membrane is transpierced by pores having diameters which are preferably within the range from about 0.001 micron to about 1 micron and more preferably within the range from about 0.1 micron to about 0.2 micron which latter range optimizes flow characteristics.

Free passage of dense gas and dissolved surfactant through membrane 14 together with inhibiting of passage of the liquid is brought about by physical and chemical characteristics of the membrane which can be varied to accommodate to different specific gases, surfactants and liquids. Establishing differential wetting of the membrane by the liquid and the dense gas/sufactant, by selection of a membrane material at which the surface tension of the liquid is higher than that of the dense gas and surfactant, is one step which can contribute to the desired result. For example, if the liquid is an aqueous fluid then a hydrophobic membrane material can contribute to the desired effect. If the liquid is an oil or other hydrophobic fluid, the membrane material may be of one of the oleophobic types.

Inhibition of passage of the liquid through the membrane pores can also result from a faster diffusion rate of the dense gas/surfactant as compared with that of the liquid caused by, for example, a lower viscosity of the dense gas/surfactant as compared with the viscosity of the liquid.

The desired differential rate of passage of the dense gas/surfactant through the membrane as compared with that of the liquid can also be affected by the size of the membrane pores. Pores which are too large result in a bulk transfer of the liquid through the membrane. For example, bulk transfer of water is more likely to occur through a polypropylene membrane having pores of one micron diameter than in a membrane having pores of 0.2 micron diameter. In general it is usually preferable to select the largest pore size which is observed to inhibit passage of the particular liquid as this maximizes the passage rate of the dense gas/surfactant thereby speeding up the process and making it more economical. Higher processing rates can also be achieved by use of a membrane having a high porosity, porosity being the percentage of the membrane which is occupied by pores.

The method is typically conducted within a temperature range of from about −10° C. to about 200° C. and at a pressure of from about 2 bar to about 700 bar. This temperature range encompasses substantially all aqueous biological systems and the pressure range encompasses operating pressures for both analytical and commercial scale systems.

In the particular embodiment of the invention shown in FIG. 1, a flow of the emulsion from an emulsion source 11 is pressurized and directed into the first region 12 of membrane contactor 13 by an emulsion pump 17 which may, for example, be a piston pump. The dense gas and surfactant constituents of the emulsion pass through the membrane 14 into the second region 16 of the membrane contactor. A liquid outflow conduit 18 carries the liquid constituent, now substantially free of dense gas and surfactant, to a liquid receiver vessel 19. The liquid is then drained from vessel 19, continuously or intermittently, through an outlet valve 21. Valve 21 is adjusted to maintain a volume of liquid in vessel 12 and to maintain elevated pressure in the vessel while releasing the liquid outflow at a location which may be at atmospheric pressure.

Dense gas and surfactant which has entered the second region 16 of membrane contactor 13 flows out through an outflow conduit 22 and may be reused in the emulsion source 16 or the surfactant may be recovered by decompressing the dense gas so that it reverts to the gaseous phase. In the embodiment shown in FIG. 1, a first outflow valve 15 may be opened to return the recovered dense gas and surfactant to emulsion source 16 or a second outflow valve 20 may be opened to release the outflow for recovery of the surfactant.

Transfer of surfactant from the first region 12 of the membrane contactor 13 to the second region 16 proceeds faster if a flow of additional dense gas is directed into the second region. This additional dense gas may obtained from the dense gas flow that is withdrawn through the outflow conduit 22. For this purpose the outflow conduit 22 transmits the outflow from second region 16 to a vaporizer 23. The vaporizer 23 is a heat exchanger, of the shell-and-tube type for example, in which external heat from a heating fluid such as steam is applied to the active surfaces to cause some of the dense gas to be converted to a recycle gas having a density of less than about 0.3 g/cc. For example, liquid $CO_2$ at 60 bar pressure and at about 0.7 g/cc density can be boiled to produce a $CO_2$ gas of about 0.2 g/cc density. The recycle gas is transmitted to a gas tank 24 through a second heat exchanger 25 which may be of the shell-and-tube type and which receives a flow of heating medium or coolant to maintain the temperature within membrane contactor 13 at the desired operating value. A dense gas pump 26, which may be a piston pump for example, pressurizes gas from tank 24 to the desired operating pressure and transmits a flow of the dense gas from the tank 24 into the second region 16 of membrane contactor 13. Flow rate of the recycled dense gas into the second region 16 is controlled, for example by varying the speed of pump 26. Adjustment of the heat input to vaporizer 23 enables the amount of recycle gas that is produced in the vaporizer to be matched with the amount of gas that is delivered to membrane contactor 13 by the dense gas pump 26. Outflow valves 15 and 20 may be adjusted to maintain the desired operating pressure within membrane contactor 13.

Liquid receiver vessel 19 serves as a pulse dampening buffer which prevents large transmembrane pressure differences from occurring within the membrane contactor 13. For this purpose a flow line 29 communicates the interior of vessel 19 with the second region 16 of the membrane contactor 13 and the liquid outlet valve 21 is adjusted to maintain a volume of dense gas in the upper region of the vessel as well as the volume of liquid in the lower region of the vessel which has been previously described. Thus any incipient sizable pressure difference between the first and second regions 12 and 16 of membrane contactor 13 is suppressed within the vessel 19. A liquid level sensor and indicator 31 of one of the types known to the art may be used to monitor the liquid level within vessel 19.

Figure 2:
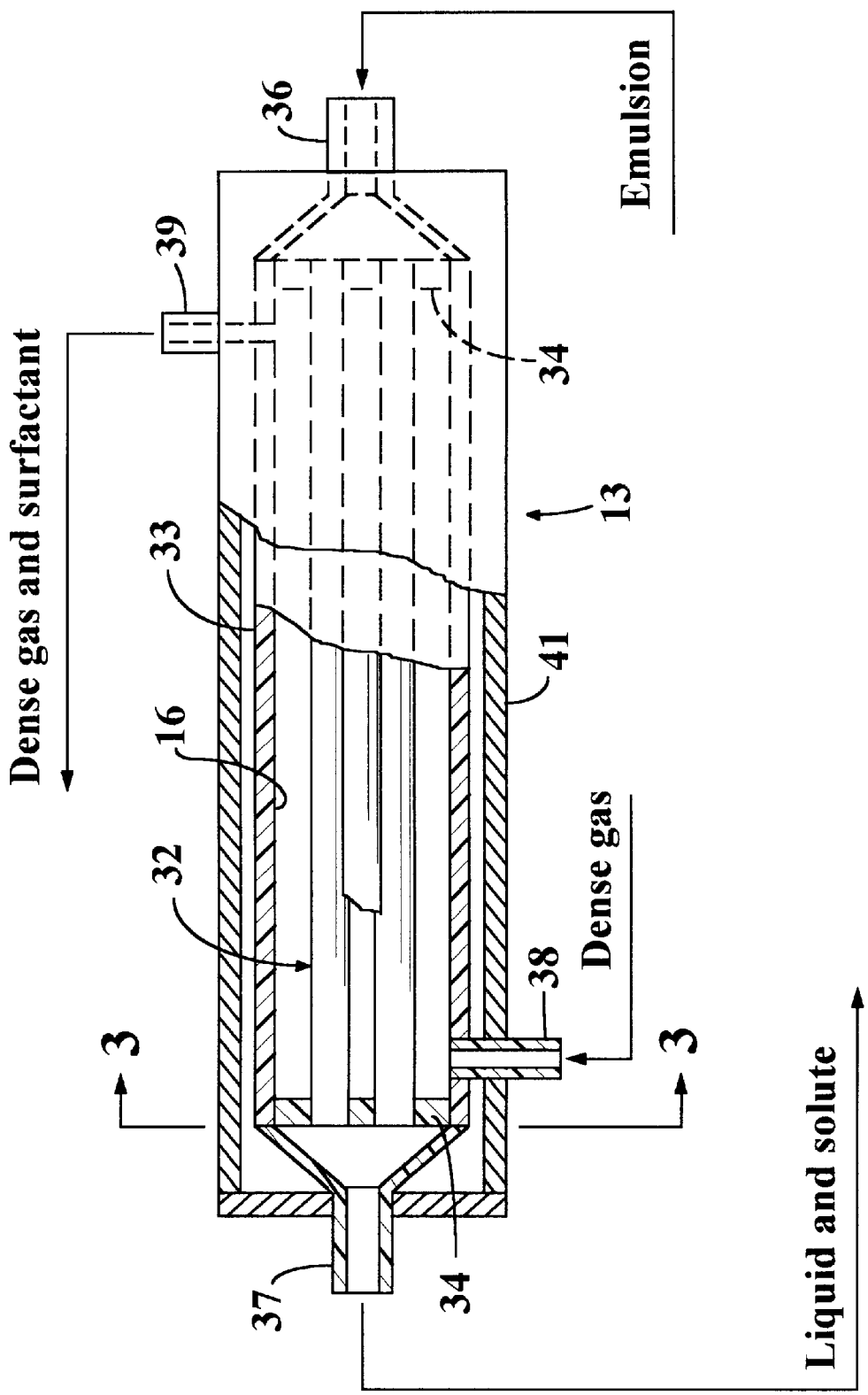
FIG. 2 is a broken out side view of a membrane contactor which is a component of the apparatus of FIG. 1.
Figure 3:
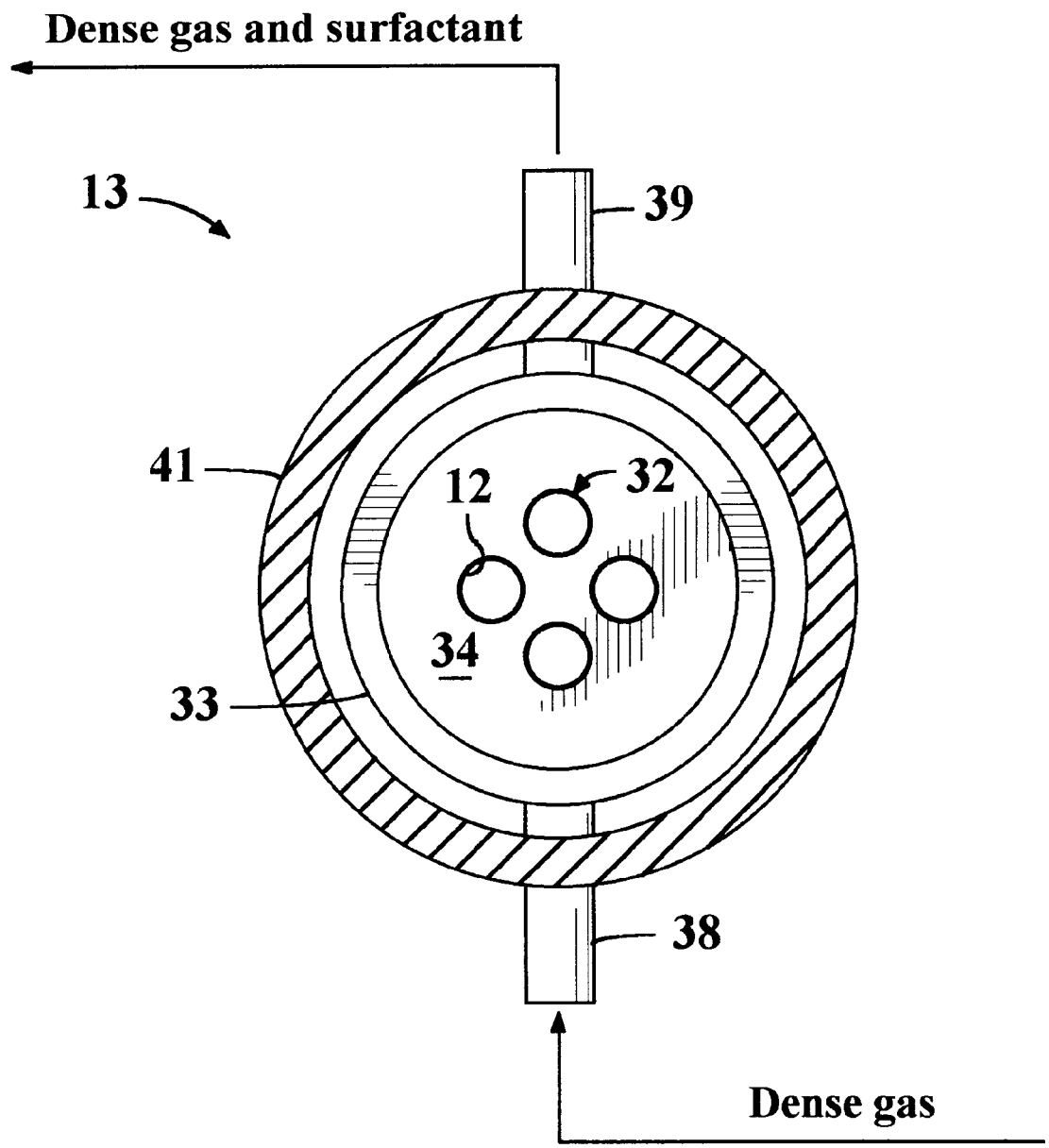
FIG. 3 is a cross section view taken along line 3—3 of FIG. 2.

The membrane contactor 13 may have any of variety of configurations but is preferably of the form depicted in FIGS. 2 and 3. The membrane 14 in a contactor 13 of this preferred type includes one or more tubular hollow fiber membranes 32. Use of elongated hollow fiber membranes 32 provides a high contact surface area within a given volume of the interior of the contactor 13. The hollow fiber membranes 32 are formed of porous material having the properties which have hereinbefore been described. A membrane contactor 13 of this kind which is designed for commercial scale operation will typically include many more of the hollow fiber membranes 32 than are depicted in FIGS. 2 and 3.

The fiber membranes 32 of this particular embodiment are linear and extend longitudinally in parallel and slightly spaced apart relationship within a tubular shell 33. Ends of the fiber membranes 32 extend through end closures 34 at each end of shell 33. An emulsion inlet port member 36 at one end of shell 33 acts as a manifold which directs incoming emulsion into the adjacent ends of the hollow fiber membranes 32. A similar liquid/solute outlet port member 37 at the opposite end of the shell 33 receives liquid which has traveled through the membranes 32 and channels such liquid into the previously described liquid outflow conduit 18. Thus the lumens of the hollow fiber membranes provide an emulsion flow path which is the first region 12 of the membrane contactor 13 in this example of the invention.

A tubular dense gas flow inlet port 38 communicates with the interior of shell 33 at one end of the shell and a similar dense gas and surfactant outlet port 39 communicates with the interior of the shell at the opposite end thereof. Thus portions of the interior of shell 33 which are outside of the hollow fiber membranes 32 provide a dense gas flow path which is the second region 16 of the membrane contactor 13 in this embodiment of the invention. The dense gas ports 38 and 39 are preferably located to provide for counter-current flow in which the dense gas travels along shell 33 in a direction which is opposite to the flow direction of the emulsion within fiber membranes 32. Ports 38 and 39 and port members 36 and 37 protrude from a housing 41 which encloses the shell 33.

The above described porting arrangements cause the lumens or interior regions of the fiber membranes 32 to function as the previously described first region 12 of the membrane contactor 13 while the interior region of shell 33 that is outside of the membranes functions as the second region 16 of the contactor. The porting arrangements can be reversed so that the incoming emulsion flows into one of the ports 38 and 39 and liquid flows out of the other while dense gas is directed into one of the port members 36 and 37 and flows out of the other port member. In this alternate arrangement the lumens of the fiber membranes 32 function as the second region of the membrane contactor 13 while the interior region of shell 33 that is outside of the membranes functions as the first region of the contactor.

Membrane contactors having a different configuration can also be used in the practice of the invention. The membrane 14 may, for example, be a flat membrane configured in a spiral-wound membrane module or a plate frame.

EXAMPLE

Figure 4:
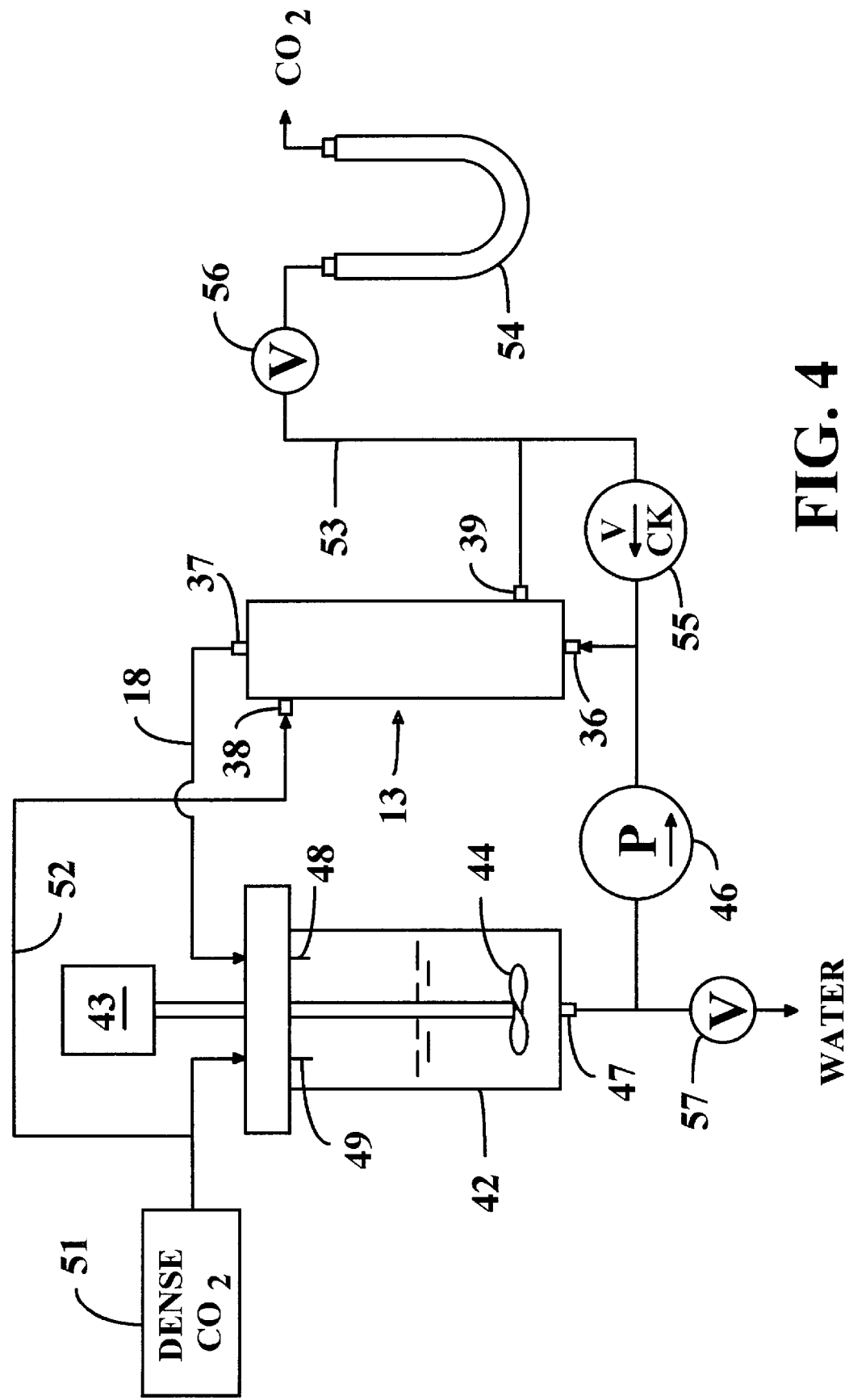
FIG. 4 is a schematic diagram depicting experimental apparatus which was used to break a dense gas/liquid/surfactant emulsion in an example of the practice of the invention which will hereinafter be described.

FIG. 4 depicts experimental equipment used in the example of breaking a dense gas/liquid/surfactant emulsion by practice of the invention that will now be described. The emulsion was prepared in a vessel 42 which is an Autoclave Engineers 300 cc bolted closure autoclave equipped with the Magne Drive II stirrer 43 with a turbine type impeller 44. The equipment included a membrane contactor 13 of the previously described type which was a Secor (Setec Inc.) membrane contactor in which a stainless steel housing contains a contactor module having 120 polypropylene hollow fiber membranes of 0.6 mm inside diameter. The fibers have an average pore size of 0.2 micrometers, 70% porosity and a wall thickness of 200 micrometers. The hollow fiber module is a 40 cm long shell-and-tube arrangement of the type previously described with reference to FIGS. 2 and 3. The porous polypropylene membrane was chosen as the surface tension of water at the surface of a membrane of this type is much higher than that of dense $CO_2$ (with or without dissolved surfactant).

Referring again to FIG. 4, a recirculating pump 46 was used to pump fluid from an outlet 47 at the base of vessel 42 into emulsion inlet port 36 of membrane contactor 13. Pump 46 is a magnetic drive gear pump, Micropump model 1805/56C, producing a flow rate of 10–100 cc/min. The liquid outflow conduit 18 returned flow from the liquid output port 37 to an inlet 48 at the top of vessel 42. Another inlet 49 at the top of vessel 42 enabled dense $CO_2$ from a dense $CO_2$ source 51 to be directed into the vessel and a conduit 52 enabled direction of a flow of the $CO_2$ from source 51 into dense gas inlet port 38 of membrane contactor 13. The dense $CO_2$ source 51 is a Dense Gas Management System (Marc Sims SFE, Inc.) which provides $CO_2$ pumping and flow rate measurement. A flow line 53 enabled outflow from the dense gas and surfactant outlet port 39 to be delivered to a glass U-tube residue collector 54 through a heated expansion valve 56. The expansion valve 56 is a modified Autoclave Engineers micrometering valve wrapped with an electric heater. A valve 57 enabled selective draining of fluid from the outlet 47 at the base of vessel 42. A check valve 55 was connected between ports 36 and 39 and was oriented to allow flow of dense gas from port 39 towards port 36 while blocking fluid flow in the opposite direction. The check valve 55 provided for pressure equalization within the two flow regions of membrane contactor 13 during start up and upsets. This provided protection against high transmembrane pressure differentials would could damage the membrane. The above described flow routing caused the lumen side of the hollow fiber membranes to function as the previously described first region of the membrane contactor 13 and the region adjacent to the membranes to function as the previously described second region.

A $CO_2$—soluble surfactant consisting of 0.75 g of the ammonium salt of a polyfluoroether carboxylic acid (Krytox 157FSH, DuPont de Nemours Co.) was added to the vessel 42. The surfactant is prepared by the method described in D. A. Newman et al, "Phase Behavior of Fluorether-Functional Amphiphiles in Supercritical Carbon Dioxide", *The Journal of Supercritical Fluids*, 6, p205–210 (1993). Then 20 cc of water which was deeply colored by a trace of methyl orange dye was added. Methyl orange is soluble in water but not in dense $CO_2$. After the water and surfactant were added, the system was sealed and filled with $CO_2$ at 200 bar pressure and at a temperature of 24° C. Stirrer 43 was turned on for about 5 minutes at a speed of 1000 rpm to create the dense $CO_2$/water/surfactant emulsion. Also the recirculation pump 46 was started and was kept running during the entire experiment. After stirring, expansion valve 46 was opened to maintain a flow of $CO_2$ of 8.6–11.2 g/min.

Immediately after starting $CO_2$ flow, an oily surfactant residue began to collect in the glass U-tube collector 54. No orange color appeared. The residue was collected and weighed at three times during $CO_2$ flow and emulsion recirculation. The results were:

| Total $CO_2$ flow (grams) | Residue weight (grams) |
|---|---|
| 198 | 0.3195 |
| 652 | 0.4382 |
| 839 | 0.0604 |
| Total: | 0.8181 |

The appearance of the residue was that of surfactant, clouded by the presence of a little water. Water is slightly soluble in dense $CO_2$ (0.2 wt %) and therefore some passed through the membrane dissolved in $CO_2$. The trace of water which was collected accounts for the fact that the amount of residue which was collected (0.82 g) is greater than the amount of surfactant (0.75 g) that was added to the vessel 42.

The water was drained from vessel 42 and its solute methyl orange was free of surfactant residue. The essentially complete recovery of surfactant in the U-tube collector and its lack of orange color indicates that the membrane contactor 13 broke the emulsion, allowed the $CO_2$ and surfactant through the membrane, prevented bulk flow of water through the membrane pores and effected bulk flow of non-emulsified water through the membrane lumens.

While the invention has been described with reference to specific embodiments for purposes of example, many modifications and variations are possible and it is not intended to limit the invention except as defined by the following claims.

What is claimed is:

1. A method of demulsifying an emulsion which includes dense gas, a liquid which is immiscible with the dense gas and a dense gas soluble surfactant which has a stabilizing effect on said emulsion, comprising the steps of:

directing said emulsion into an emulsion flow path which is within a membrane contactor wherein the emulsion flow path is separated from a dense gas flow path by a porous membrane having pores which enable passage of dense gas and surfactant into said dense gas flow path through the pores and which inhibit passage of the liquid through the pores into said dense gas flow path;

withdrawing substantially surfactant free liquid from said emulsion flow path of said membrane contactor and withdrawing dense gas and surfactant from said dense gas flow path of said membrane contactor.

2. The method of claim 1 including the further step of establishing substantially equal initial pressures in said emulsion flow path and said dense gas flow path of said membrane contactor during the initial introduction of the emulsion into the emulsion flow path.

3. The method of claim 1 including the further step of maintaining the pressure in the emulsion flow path of the membrane contactor marginally higher than the pressure in the dense gas flow path thereof as demulsification of said emulsion proceeds.

4. The method of claim 1 including the further step of directing a flow of additional dense gas into said dense gas flow path of said membrane contactor while said emulsion is being directed into said emulsion flow path thereof.

5. The method of claim 4 wherein said additional dense gas is obtained from the flow of dense gas and surfactant that is withdrawn from said second region of said membrane contactor.

6. The method of claim 5 including the steps of obtaining said additional dense gas by vaporizing a portion of the dense gas and surfactant that is withdrawn from said second region of said membrane contactor to produce a flow of vaporized gas, pressurizing said flow of vaporized gas to increase the density thereof, and returning the flow of pressurized gas to said second region of said membrane contactor.

7. The method of claim 6 including the further step of adjusting the temperature of said flow of vaporized gas to maintain a desired temperature within said membrane contactor.

8. The method of claim 1 wherein said emulsion is obtained from an emulsion source wherein said emulsion is used as a processing fluid to extract a solute from a substance, including the further step of returning at least a portion of the dense gas and surfactant that is withdrawn from said second region of said membrane contactor to said emulsion source for reuse therein.

9. The method of claim 1 wherein said dense gas is one which is a gas at normal atmospheric pressures, including the further step of pressurizing said dense gas sufficiently to cause it to have a density of at least about 0.3 grams per cubic centimeter.

10. The method of claim 1 including the further steps of maintaining the temperature within said membrane contactor within the range from about −10° C. to about 200° C. during demulsification of said emulsion, and maintaining the pressure within said membrane contactor within the range from about 2 bar to about 700 bar during demulsification of said emulsion.

11. The method of claim 1 including utilizing a porous membrane in said membrane contactor which has a wall thickness within the range from about 0.005 mm to about 3 mm.

12. The method of claim 11 including utilizing a porous membrane having a wall thickness within the range from about 0.2 mm to about 0.6 mm.

13. The method of claim 1 wherein said dense gas is $CO_2$ and said liquid is water.

14. The method of claim 1 including the further steps of using at least one hollow fiber porous membrane as said porous membrane and using an interior region of said hollow fiber porous membrane as one of said first and said second region, and using a region which is outside of and adjacent to said hollow fiber porous membrane as the other of said first and second regions.

15. The method of claim 1 including the further steps of using a plurality of hollow fiber porous membranes as said porous membrane, directing a flow of said emulsion into said hollow fiber porous membranes whereby interior lumens of said hollow fiber porous membranes function as said first region of said membrane contactor and a region outside of and adjacent to said hollow fiber porous membranes functions as said second region thereof.

16. The method of claim 1 wherein said dense gas is $CO_2$ and said liquid is water, including the further steps of maintaining the pressure within said emulsion flow path within the range from about 2 bar to about 700 bar, maintaining the temperature within said emulsion flow path within the range from about −10° C. to about 200° C., and utilizing at least one hollow fiber porous membrane having a wall thickness in the range from about 0.005 mm to about 3 mm.

* * * * *